Figure 1:
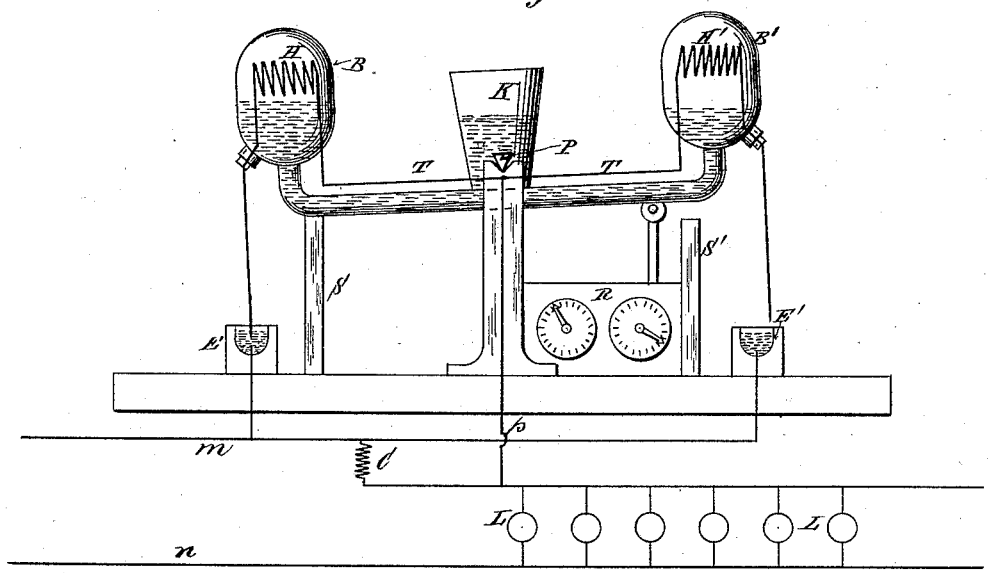

(No Model.)

E. THOMSON.
ELECTRIC METER.

No. 415,748. Patented Nov. 26, 1889.

Witnesses:
D. W. Gardner
[signature]

Inventor:
Elihu Thomson
By his Attorney,
H. C. Townsend

UNITED STATES PATENT OFFICE.

ELIHU THOMSON, OF LYNN, MASSACHUSETTS.

ELECTRIC METER.

SPECIFICATION forming part of Letters Patent No. 415,748, dated November 26, 1889.

Application filed August 5, 1889. Serial No. 319,831. (No model.)

*To all whom it may concern:*

Be it known that I, ELIHU THOMSON, a citizen of the United States, and a resident of Lynn, in the county of Essex and State of Massachusetts, have invented certain new and useful Electric Meters, of which the following is a specification.

My invention relates to that class of apparatus in which the heating effects of an electric current are employed for producing an oscillatory or other movement of a pivoted structure for the purpose of obtaining a motive mechanism for measuring an electric current.

My invention is especially applicable to that class of devices in which an oscillatory movement is produced by the shifting of a weight, which shifting causes a variation in the position of the center of gravity of a structure and causes the same to tilt or oscillate.

My invention is applicable to devices of this nature whether the shifted weight be a body of fluid, as in the form of apparatus hereinafter described, or a solid body.

My invention is, however, especially applicable to that class of meters or motors in which a body of fluid is shifted by the expansive effect produced in a gas—such as air—by the heating effect of an electric current circulating in a heating-coil. In an apparatus of this character there is a natural tendency to an increase of a number of oscillations or the movement of the structure more than proportional to the increase of electric current, owing to the fact that the heating effect of the current is as the square of such current.

My invention consists in a novel method of compensating or correcting this tendency, so that a movement or oscillation of the structure may be obtained which shall be directly proportional to the increase of current, or so that, if desired, the action of the apparatus under different currents may be determined or varied as desired. Thus in the case of an electric meter my invention permits me to make the meter sensitive to small loads at the expense of its sensitiveness to large loads, whereby the meter may be caused to register in lesser degree for large loads than for light loads.

My invention consists, essentially, in varying the height of the center of gravity of the structure with the variations in the strength of current operating on the apparatus. Thus, for instance, in the case of an ordinary meter the center of gravity of the structure would be raised as the current increased, thus requiring a greater proportional strength of current to overset or produce an oscillation or movement of the structure from one position to the other than is required with a smaller current, thereby compensating for the tendency to an increase in the proportions of oscillations when the current to be measured increases.

I have in Figure 1 of the accompanying drawings shown in side elevation one form of meter to which my invention may be applied. Figs. 2, 3, 4, and 5 illustrate modifications in the form of the vessel, by which a liquid column may be made to vary for the purpose of changing the center of gravity of the structure, as hereinafter described. Fig. 6 illustrates a modification which may be given to the form of the closed chamber for the purpose of producing the same effects.

The form of apparatus which I have herein shown is the same as that described in another application for patent filed by me April 8, 1889, Serial No. 306,387.

No claim is herein made to the form of apparatus, my invention being for the method hereinafter described and claimed.

B B' are chambers or bulbs containing confined bodies of air or gas—confined in the sense that it is held by a liquid seal below and that the chambers are partly filled with fluid, as shown.

H H' are electric heaters consisting of coils of conducting-wire heated by the passage of the current through them.

E E' are mercury-cups into which terminals of the coils H H' dip alternately for the purpose of putting them into circuit. The opposite ends of the coils connect to a common conductor $p$, connecting through lights or other devices L with the opposite main $n$. The mercury-cups connect with the main $m$.

T T are tubes connected with the bulbs B B' and terminating in a chamber K. The tubes and chambers contain the liquid upon which the expansible air or gas in the bulbs acts. The chamber K is open to the atmosphere, and the whole structure is pivoted at point P in any suitable manner. Suitable stops S S' limit the play or swing of the system.

When the apparatus is not in use, the center of gravity is slightly above the point of support P, so that it is in unstable equilibrium and will tip readily from side to side. The oscillation is produced by the shifting of the liquid in the tubes T T' and the bulbs by the heating effects of the current in the coils H H'. Thus, for instance, if the coil H be heated the liquid will be heated, so that the side B will become practically lighter, and the structure will tilt, so that coil H' will be heated and coil H will be thrown out of circuit. A reverse movement then ensues through the shifting of the liquid from bulb B' and tube T toward the center, thus making that side of the structure practically lighter.

R is a register for counting the number of oscillations of the structure. With an increase of current the oscillations of the structure would be more than proportional to such increase on account of the fact that the heating of the conductors by the current is as the square of such current. To overcome this tendency, I propose to automatically raise the center of gravity of the structure, so that a greater proportionate movement of the liquid in one side or the other will be obtained before the balance of the structure is sufficiently disturbed to cause it to tilt. This lifting or raising of the center of gravity may be attained by proper attention to the capacity in cross-section of the vessel K. Thus, for instance, if the section or capacity of such vessel be made less than the sum of the section of the two bulbs B B' the elevation of the liquid column in K when the meter is brought into operation will be greater than the combined depression in the vessels B B' by the joint expansion which the air in them undergoes with a higher average temperature.

It will of course be understood that when both coils are alternately heated and rather quickly, as when considerable current is passing, both will continue to increase in temperature, but to a certain limit, and will keep the air under a certain average minimum expansion, permanent in both bulbs, the transfer of the liquid being then made by the excess of the heating over the cooling, the oscillation being accomplished by the tendency to contraction and entrance of liquid at one side where the current is formed, assisted by the expansion and depression of the liquid at the other side where the current is not.

Figure 2:
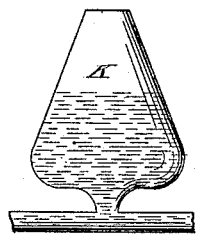

The rate at which the center of gravity shall be raised and the consequent effect thereof in determining or slowing down the operation of the apparatus can be controlled by the shape given to the side of the vessel K, or its horizontal section at different heights. Thus, for instance, by contracting the vessel K, as indicated in Fig. 2, a rapid increase in the lifting of the center of gravity will be caused by the increased average heat of the heaters H H', and the margin of shifting of liquid required to overset or disturb the balance will be correspondingly increased. In this instance it is obvious that the compensating action or effect will increase in much greater ratio or proportion than the form of chamber such as indicated in Fig. 1.

It is obvious that by varying or determining the rate at which the center of gravity shall be raised with any given average depression of the liquid in the bulb B B', due to greater average heat in the coils H H', the action of the apparatus under different loads may be readily determined.

Figure 3:
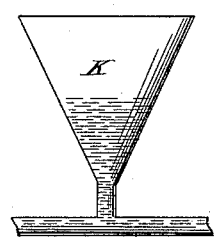
Figure 4:
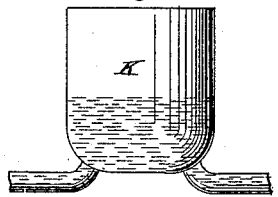
Figure 5:
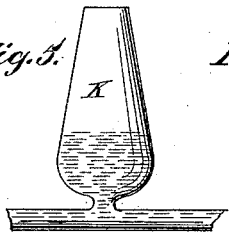
Figure 6:
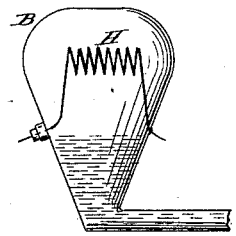

Figs. 3, 4, and 5 illustrate various forms that the vessel K may be given for this purpose. Each form of vessel will confer a different property on the meter with differences of load, and by proper conformation, so as to determine the variations in the positions of the center of gravity, the sensitiveness of the meter to small currents or small loads may be increased at the expense of the sensitiveness to large currents or loads, or vice versa. As the position of the center of gravity is determined by the rate at which the liquid column rises in K, and as such rate of rising depends also upon the rate at which liquid is expelled or moved from the bulbs B B', where its level falls, it is obvious that the position of the center of gravity might be determined by properly shaping the bulbs B or B' at their bottom, where the level of the liquid rises and falls, as illustrated in Fig. 6.

What I claim as my invention is—

1. The herein-described method of obtaining a compensation or correction in a meter operated by the heating effects of an electric current, consisting in shifting the center of gravity of the pivoted structure as the current increases, so as to increase the obstacle to oversetting.

2. In an electric meter operated by the disturbance of balance of a pivoted structure produced by the heating effects of an electric current, the method of obtaining a registry proportional to the increase of current, consisting in utilizing the heating effects of the current to shift the center of gravity of the structure as the current increases.

3. In an electric meter or motor comprising an oscillating structure and a shiftable weight or body moved by the heating effects of the current, the herein-described method of determining the action of the apparatus under variations of load, consisting in changing the position of the center of gravity of the structure in accordance with such variations.

4. In an electric meter or motor consisting of an oscillating or pivoted structure carrying a shiftable liquid weight and electric heaters for shifting such weight, the herein-described method of determining the action of the apparatus under variations of load, consisting in causing a column of the liquid to shift at a determinate rate according to the action desired.

Signed at Lynn, in the county of Essex and State of Massachusetts, this 1st day of August, A. D. 1889.

ELIHU THOMSON.

Witnesses:
JOHN W. GIBBONEY,
A. L. ROHRER.